Patented Oct. 17, 1922.

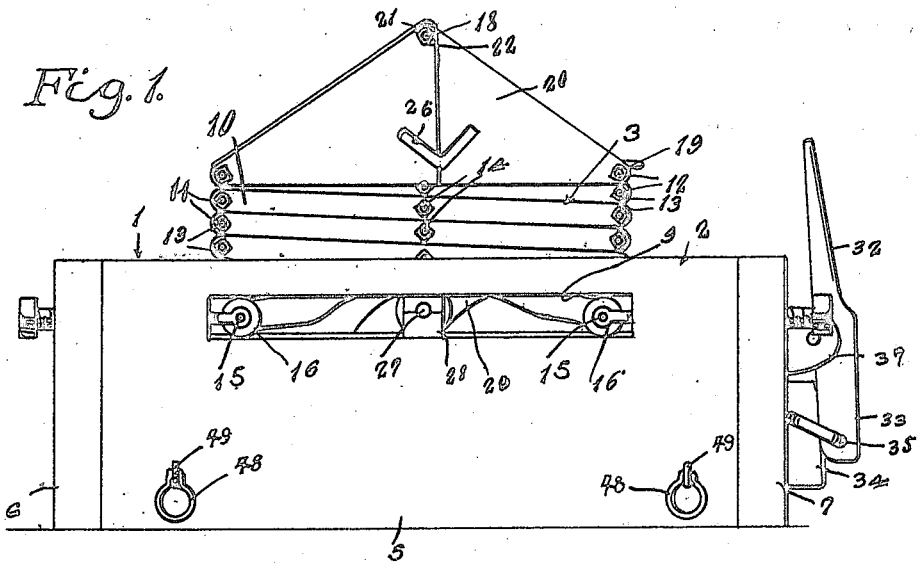

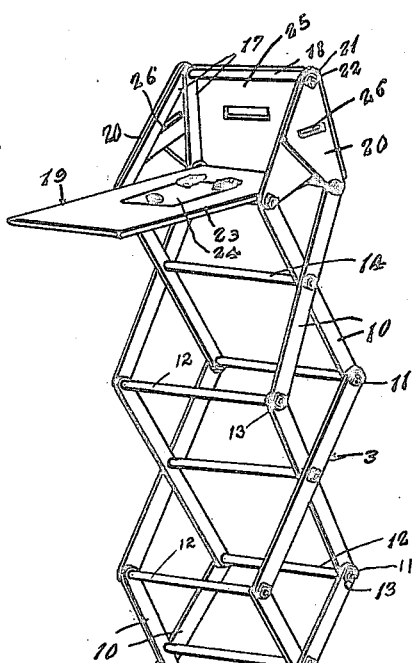
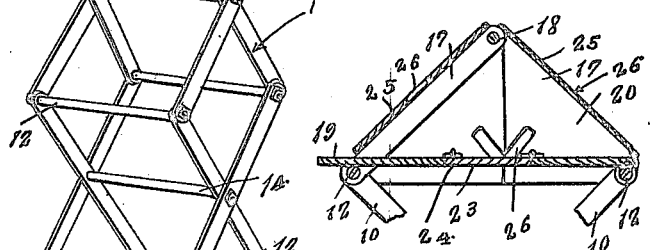
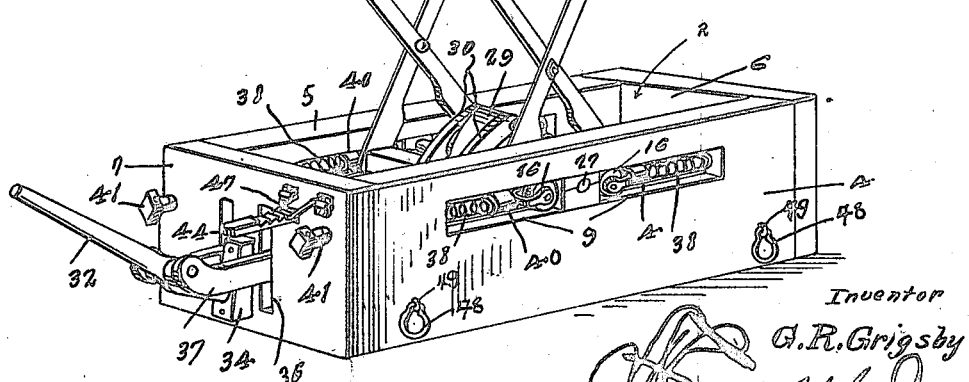

1,432,063

UNITED STATES PATENT OFFICE.

GEORGE R. GRIGSBY, OF PUEBLO, COLORADO.

DISAPPEARING OBSERVATION POST.

Application filed January 9, 1919. Serial No. 270,382.

*To all whom it may concern:*

Be it known that I, GEORGE R. GRIGSBY, a citizen of the United States, residing at Pueblo, in the county of Pueblo and State of Colorado, have invented certain new and useful Improvements in Disappearing Observation Posts; and I do hereby declare the following to be a full, clear, and exact description of the invention, such as will enable others skilled in the art to which it appertains to make and use the same.

This invention relates to observation posts for use in warfare, and the primary object of the invention is to provide a portable observation post which is so constructed that the same can be readily collapsed, so as to hide the device from the eyes of the enemy.

Another object of the invention is to provide an improved portable observation post, which can be raised or lowered to any desired height, within certain limits, so that the observer can obtain a view of the enemy's territory.

A further object of the invention is to provide an improved portable collapsible observation post, having an improved means for raising and lowering the same, so that the device may be readily moved or placed into position.

A still further object of the invention is to provide an improved means for automatically starting the device into its raised position, said means also forming a cushion for the device, when the same is being collapsed, and thus effectively absorb the shock incident thereto.

A still further object of the invention is to provide an improved means for locking the device in its raised or lowered position, so that the device will be held against accidental displacement.

A still further object of the invention is to provide an improved device of the above character, which is durable and efficient in use, one that is simple and easy to manufacture, and one that can be placed upon the market at relatively low cost.

With these and other objects in view, the invention consists in the novel construction, arrangement and formation of parts, as will be hereinafter more specifically described, claimed and illustrated in the accompanying drawings, forming a part thereof, in which:

Figure 1 is a side elevation of an improved observation post in its collapsed position.

Figure 2 is a perspective view showing the improved device in its raised position, one end wall of the observation platform being left off for clearness.

Figure 3 is a longitudinal vertical sectional view through the observation platform, and Figure 4 is a horizontal section taken through the base of the post-structure.

Referring to the drawings, in detail, wherein similar reference characters designate corresponding parts throughout the several views, the numeral 1 generally indicates the improved device, which includes a substantially rectangular hollow base 2 and a collapsible body 3.

The base 2 includes side walls 4 and 5, end walls 6 and 7, and a bottom wall 8. The side walls 4 and 5 are provided with alined horizontal slots 9, which form tracks for slidably receiving the lower portions of the collapsible body 3.

The collapsible body 3 is constructed along the lazy-tong principle and includes a plurality of crossed arms 10, which have their opposite ends pivotally connected together as at 11, by means of rungs or pivot bars 12, which have their terminals reduced and screw threaded and extended through apertures in the meeting ends of the arms. Suitable locking nuts 13 are fitted on the threaded ends of the rungs 12. The crossed arms are pivotally connected together at their point of intersection by pivot bars 14 which are connected to the arms in the same manner as the rungs 12. The lowermost arms 10 are rotatably connected to shafts 15, which have rollers 16 rotatably mounted on the ends thereof. The rollers 16 are mounted in the slots 9 for movement in a horizontal plane therein. The uppermost rungs 12 support for swinging movement thereon relatively short arms 17, which are hingedly connected together at their upper ends by means of a rod 18, which has its terminals extending through and beyond the outer faces of the relatively short arms 17.

The uppermost bar 18 pivotally supports the observation platform 19 which includes triangular side walls 20, which have the apex portions thereof apertured as at 21 for rotatably receiving the terminals of the bar 18. Suitable lock nuts 22 are threaded on the ends of the bar 18. A bottom wall 23, which forms a supporting platform for the observer is pivotally secured to one of the uppermost rungs 12 at one side of the device and the opposite end of the platform is left free and preferably engages the opposite rung 12. A suitable trap door 24 may be provided in the bottom wall if so desired. End walls 25 are secured to the outer edges of the arms 17 and when the body 3 is in its raised position a complete housing is formed at the upper end thereof. The walls 20, 25 and 23 are preferably formed of sheet steel so as to provide a protection for the observer. These walls are also provided with slots 26, whereby the observer may readily see the surrounding landscape.

A central shaft 27 has the terminals thereof rotatably received in bearings 28, which are secured to the central portions of the upper and lower walls of slots 9 and this shaft has secured thereto a two-armed lever 29, which has its terminals pivotally connected to links 30. The opposite terminals of the links 30 are rotatably secured to the shafts or lowermost rungs 16, as at 31. Thus it will be seen that when the shaft 27 is rotated the shafts 15 can be readily moved towards or away from each other so as to raise or lower the body 3. An operating lever 32 is provided for operating the shaft 27 and the lever has its lower end curved downwardly as at 33 and secured to a block 34, by means of a pivot pin 35 to the end wall 7. The end wall 7 is provided with central vertical slots 36 for receiving connecting links 37 which have one terminal thereof pivotally connected to the upper arm of the two-armed lever 29 and their opposite terminal pivotally connected to the operating lever 32. Thus by raising and lowering the lever 32, the shaft 27 will be readily rotated for raising and lowering the body 3.

A plurality of expansion coil springs 38 are provided for transmitting an initial push to the lower shafts 15 when it is desired to raise the body 3, so as to facilitate the movement thereof. The terminals of the coil springs are confined in caps 39 and 40. The caps 40 are secured to the lower shafts 15 and the caps 39 are carried by set screws 41, which are fitted in the end walls 6 and 7. The screws 41 are provided with operating handles 42, whereby the same can be readily turned. These screws provide means whereby the tension of the springs 38 may be varied. These springs also form a cushion for the body 3, when the same is being collapsed, so as to effectually absorb the shock incident thereto.

To hold the body 3 in its raised position and in its lowered position against the tension of the coil springs 38, a suitable lock is provided which includes a rack bar 44 which protrudes through an aperture 45, which slidably receives the same. The inner end of the rack bar 44 is carried by one of the shafts 15, as at 46. A pivoted pawl 47 is arranged to engage the teeth of the rack bar, and hold the same against movement, which will hold the body 3 in any desired position against accidental displacement.

Rings 48 are carried by eyes 49 secured to the side walls of the casing and these rings form means, whereby ropes may be passed through the same to secure the casing to a vehicle or for receiving pegs or other anchoring means for holding the same against movement, when the same is placed in operative position on the ground.

From the foregoing description, it can be seen that an improved observation post is provided, which can be readily lowered or collapsed, so as to effectively hide the same from the eyes of the enemy.

In practice, I have found that the form of my invention illustrated in the accompanying drawings and referred to in the above description, as the preferred embodiment, is the most efficient and practical; yet realizing the conditions concurrent with the adoption of my device will necessarily vary, I desire to emphasize that various minor changes in details of construction, proportion and arrangement of parts may be resorted to, when required without sacrificing any of the advantages of my invention as set forth.

What I claim as new is:

1. A device of the class described having a container with slots in its walls, a collapsible tower having shafts, springs to urge the shafts toward each other to extend the tower, and to absorb shocks incidental to collapse thereof, said walls having recesses, retainers on said shafts extending into the recess, said springs being disposed in said recesses and entering the retainers, and means associated with said shafts and containers to positively extend the tower.

2. A device of the class described having a container with slots in its walls, bearings intermediate the ends of the slots, a shaft journalled in said bearings, a collapsible tower having shafts, the last mentioned shafts being disposed one on each of opposite sides of said bearings and extending into the slots, means operable to turn the first shaft, and means to slide the second shafts away from the first shaft through turning movement of the latter to control the elevation of the tower.

3. A device of the class described having a container with slots in its walls, bearings intermediate the ends of the slots, a shaft journalled in said bearings, a collapsible tower having shafts, the last mentioned shafts being disposed one on each of opposite sides of said bearings and extending into the slots, means operable to turn the first shaft, means to slide the second shafts away from the first shaft through turning movement of the latter to control the elevation of the tower, and means disposed adjacent the ends of the slots to urge the shafts of the tower toward each other and to absorb shocks incident to collapse of the tower.

In testimony whereof I affix my signature in presence of two witnesses.

GEORGE R. GRIGSBY.

Witnesses:
 HELEN JEAN HENRY,
 WILKINS O. PETERSON.